Patented July 11, 1939

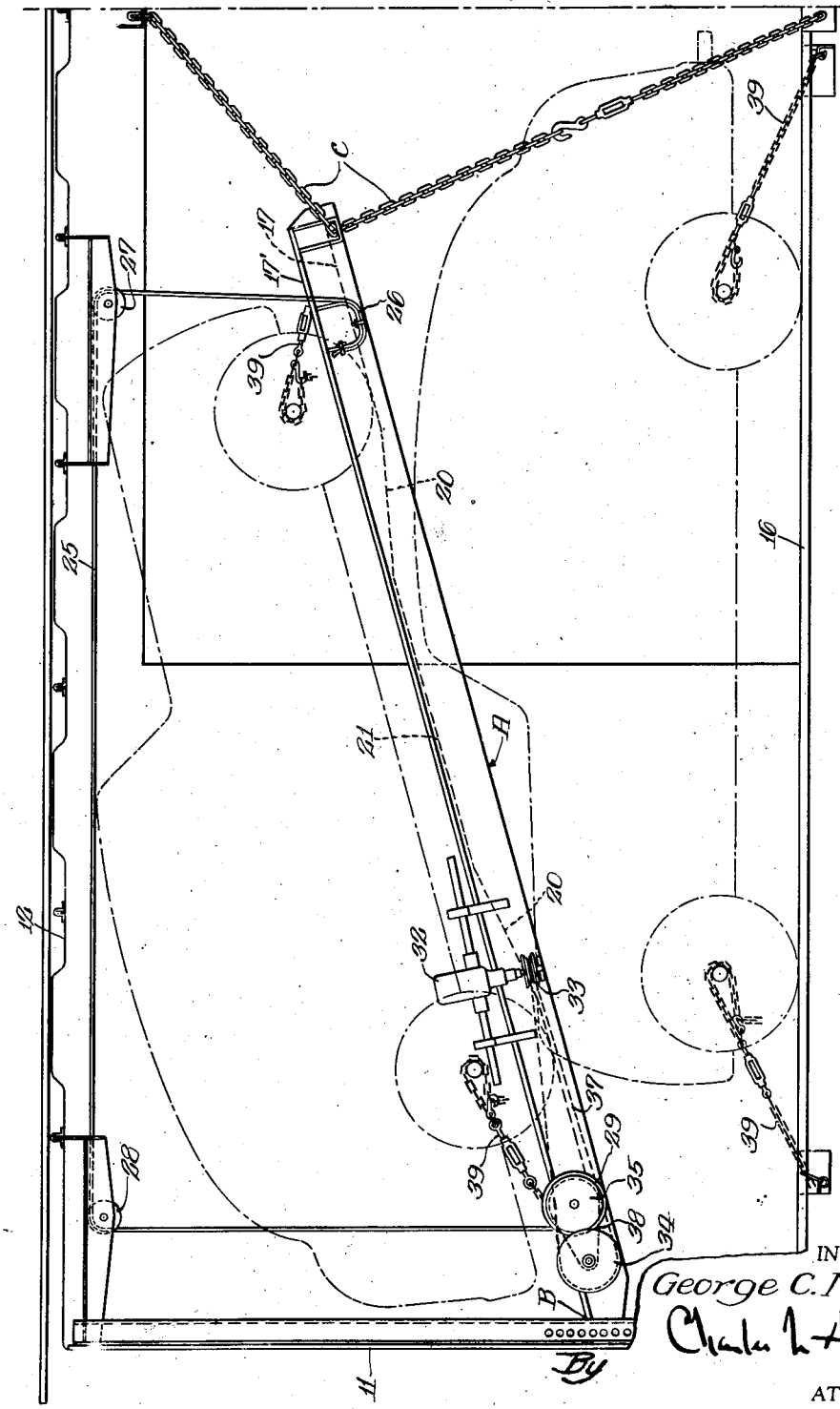

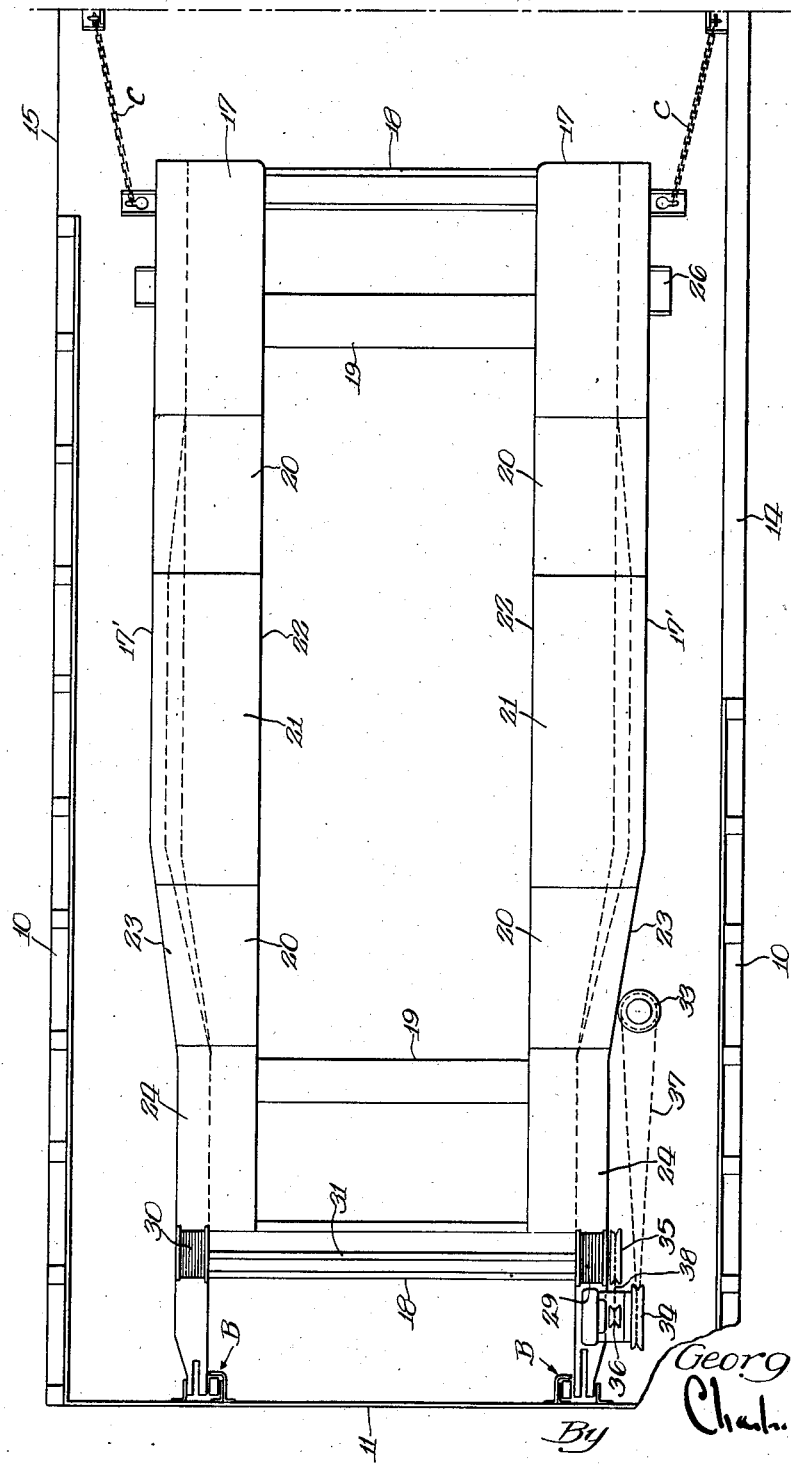

2,165,400

UNITED STATES PATENT OFFICE 2,165,400

VEHICLE SUPPORTING DECK

George C. Meyers, Michigan City, Ind.

Application May 24, 1938, Serial No. 209,709

7 Claims. (Cl. 105—368)

My invention relates to a novel deck or rack which is used to support an automobile or other wheeled vehicle in an elevated or tilted position for transportation in a freight car.

In loading automobiles for shipment in freight cars it is common practice to support two automobiles on the floor of the car and to support an elevated automobile upon a deck over each of the floor supported vehicles, means being provided for raising and lowering the deck upon which the elevated vehicle is supported.

One object of my invention is to provide a vehicle supporting deck, one end of which is narrow or of decreased width with relation to the opposite end.

Another object of my invention is to provide a simple, rugged and inexpensive deck having longitudinally disposed wheel supported runways which are narrowed at one end.

Another object of my invention is to provide a deck for supporting a vehicle in a freight car which is so arranged as to be raised or lowered by an operator standing in a convenient place within the car.

A further object of my invention is to provide a novel deck having elevating mechanism mounted on the deck and means mounted on the deck for operating the elevating mechanism, which means is positioned on the deck at a point conveniently accessible to the operator, standing adjacent the narrow end of the deck.

Further objects of the invention will become apparent from the following description and the drawings relating thereto.

Similar reference numerals and letters refer to similar parts throughout the drawings.

Figure 1 is a sectional longitudinal view taken through one-half of a freight car, showing an automobile mounted in elevated position on my improved deck, with a second automobile on the car floor therebeneath.

Figure 2 is a plan view of my deck, located in a freight car.

In the drawings the freight car includes sides 10, end 11, roof 12, staggered door openings 14 and 15, and car floor 16, the freight car wheels not being shown.

The letter A designates the deck as a whole which comprises spaced longitudinally disposed vehicle supporting runways 17, having side frame members 17′, end transversely disposed reinforcing members 18 and intermediate transversely disposed reinforcing members 19. The vehicle supporting runways are inclined upwardly at the points indicated by the numerals 20 so that the mid-portion 21 of each runway is in a slightly elevated plane with relation to the ends of the runways.

As clearly shown in Fig. 2, the distance from the inner edge 22 of each runway to the inner edge of the adjacent runway is the same throughout the length of the deck. The outer edge of each runway 17 and side frame member 17′ is tapered inwardly as at 23 so that the ends 24 of the runways adjacent the end wall of the car are narrowed. As clearly shown in Fig. 2, the end of the deck which is adjacent the end wall of the car is narrower than the opposite end of the deck.

The deck elevating mechanism is mounted on the deck and the means for operating the elevating mechanism is located on the deck adjacent the narrowed end. The inwardly tapered narrowed ends of the runways provide a convenient space between the outer edge of the narrowed runway and the side wall of the car in which the operator of the deck elevating mechanism can stand.

The deck is raised and lowered by a cable arrangement, one continuous cable operating from each side frame member of the deck. The cable arrangement is identical on each side of the deck, and as shown in Fig. 1, the cable 25 is suitably anchored to the side frame member of the deck adjacent the front end, as shown at 26. The cable runs upwardly over pulley 27 journaled adjacent the roof of the car and then runs parallel to the roof of the car toward the car end and over pulley 28 journaled adjacent the car roof near the end of the car. From this pulley the cable extends downwardly to the winding drum 29. On the opposite side of the deck there is a similarly arranged cable which terminates on the winding drum 30 shown in Fig. 2. The winding drum 30 is mounted on a common shaft 31 with the drum 29, with which shaft both drums revolve. The shaft 31 is attached to and supported by the deck side frame members in any desired manner.

In order to revolve the shaft 31 with its drums 29 and 30 so as to wind the cables on the drums and elevate the deck, I provide means including motor 32, chain sheaves 33, 34, 35 and 36, and chains 37 and 38. This deck elevating apparatus can be operated by motor or by hand and is similar to that disclosed in the co-pending application of Ernest W. Henry and Thomas H. Everett, Serial No. 167,606, filed October 6, 1937. It is sufficient to state that my novel deck with narrowed runways adjacent the end wall of the car can be elevated by any suitable hoisting means, but the deck is particularly arranged for elevating apparatus having operating means mounted on the deck which can be controlled by an operator standing in the convenient space between the narrowed runways and the side wall of the car.

The deck is suitably indexed at the rear wall of the car as designated generally by the letter B. Suitable tie-down members 39 are provided for both the floor supported and deck supported automobile as shown in Fig. 1.

The letter C in Fig. 1 designates generally an arrangement for safely supporting the front end of the deck in elevated position, this arrangement being the subject matter of the co-pending patent application of William H. Mussey, Serial No. 211,993, filed June 6, 1938.

Referring to Fig. 1 which shows the deck in elevated position, it is noted that the means for operating the elevating mechanism is located at the narrowed end of the deck, and is thus conveniently accessible to the operator even when the deck is elevated. In actual use this end of the deck upon which the operating means is located is not elevated to such a height as to be inconvenient or inaccessible to the operator.

From the foregoing it is seen that my novel deck is of decreased width at one end, although the ends of the longitudinal runways which are of decreased width, are of sufficient width to afford points of support for the wheels of automobiles and other wheeled vehicles that are transported in freight cars. My improved deck has operating means for raising and lowering the deck, carried on the deck at the narrowed end. The narrowed end is disposed adjacent the end wall of the freight car and a convenient place is provided between the narrow end of the deck and the side wall of the car for the operator of the deck raising and lowering mechanism. This mechanism is conveniently accessible to the operator when the deck is in both elevated and lowered positions.

It will be apparent to those skilled in the art that various modifications could be made in my novel deck without departing from the scope of the appended claims.

I claim:

1. A deck for supporting a wheeled vehicle in a freight car, the deck being narrowed at one end adjacent the end wall of the car and said deck having relatively wide wheel supporting runways adjacent the doors of the freight car.

2. A deck for supporting a wheeled vehicle in an elevated position in a freight car, the deck being narrowed at one end and having operating mechanism for elevating the deck adjacent the narrowed end said deck having wheel supporting runways extending longitudinally of the car, the runways being wider adjacent the doors of the freight car and narrower adjacent the end wall of the freight car.

3. A deck for supporting vehicles in a freight car comprising longitudinally disposed runways which are narrowed at one end of the deck adjacent the end wall of the car and wider at the end of the deck adjacent the doors of the freight car.

4. Apparatus for supporting a wheeled vehicle in a freight car comprising a deck having longitudinally disposed runways and side frame members, the outer edges of the runways and side frame members being tapered inwardly adjacent one end of the deck the wider portion of the runways being adjacent the doors of the freight car.

5. Apparatus for supporting a wheeled vehicle in a freight car comprising a deck having longitudinally disposed runways, the runways being narrowed adjacent the end wall of the car, whereby more space is provided between the deck and the side wall of the car at the narrowed end of the deck than between other portions of the deck and the side wall of the car.

6. Apparatus for supporting a wheeled vehicle in an elevated position in a freight car comprising a deck having means mounted thereon adjacent one end for elevating the deck, the deck including longitudinally disposed runways, the outer edges of the runways being tapered inwardly at one end of the deck whereby space is provided between the deck and the side wall of the car for an operator of the elevating means said space being located in the vicinity of the end wall of the freight car.

7. A vehicle supporting deck comprising spaced longitudinally disposed runways, transversely disposed reinforcing members connecting said longitudinal runways, the runways being of less width at one end of the deck which is adjacent the end wall of the car than at the opposite end adjacent the doors of the freight car.

GEORGE C. MEYERS.